(12) United States Patent
Garrett et al.

(10) Patent No.: US 8,281,588 B2
(45) Date of Patent: Oct. 9, 2012

(54) TURBOMACHINE SYSTEM AND TURBINE THEREFOR

(75) Inventors: Stephen Garrett, Huddersfield (GB);
Richard Owen Evans, Wakefield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 834 days.

(21) Appl. No.: 12/319,717

(22) Filed: Jan. 9, 2009

(65) Prior Publication Data

US 2009/0249786 A1    Oct. 8, 2009

(30) Foreign Application Priority Data

Jan. 11, 2008 (GB) .................................. 0800451.7

(51) Int. Cl.
*F02B 33/34* (2006.01)
*F01D 9/04* (2006.01)
*F01D 17/00* (2006.01)

(52) U.S. Cl. .................................... 60/612; 123/562
(58) Field of Classification Search .................. 60/612; 123/562

See application file for complete search history.

(56) References Cited

U.S. PATENT DOCUMENTS

| | | | |
|---|---|---|---|
| 1,588,528 A | 6/1926 | Couch | |
| 2,990,104 A | 1/1961 | Pavlecka | |
| 3,378,229 A * | 4/1968 | Erwin | 415/148 |
| 4,196,593 A * | 4/1980 | Froeliger | 60/612 |
| 2006/0123787 A1* | 6/2006 | Gobert et al. | 60/612 |
| 2007/0212215 A1 | 9/2007 | Ferber et al. | |

FOREIGN PATENT DOCUMENTS

| | | |
|---|---|---|
| EP | 0 654 587 | 5/1995 |
| EP | 0717212 A1 | 6/1996 |
| EP | 1101917 | 5/2001 |
| EP | 1 435 434 | 7/2004 |
| GB | 867578 | 5/1961 |
| GB | 1045689 | 10/1966 |
| GB | 1205632 | 9/1970 |
| GB | 2287508 | 12/1997 |
| GB | 2440343 | 1/2008 |
| GB | 0800451.7 | 4/2008 |
| JP | 57124009 | 1/1981 |
| JP | 57-124009 | 2/1982 |
| WO | WO 02/16775 | 2/2002 |
| WO | WO 2009/030914 | 3/2009 |

* cited by examiner

*Primary Examiner* — Burton Mullins
(74) *Attorney, Agent, or Firm* — Krieg DeVault LLP; Matthew D. Fair

(57) ABSTRACT

A turbomachine system comprises a first turbocharger comprising an exhaust gas flow first turbine for location in an exhaust path and a first compressor driven by said first turbine; a turbomachine for location in the exhaust path upstream or downstream of said first turbocharger and comprising an exhaust gas flow second turbine and a second compressor driven by said second turbine. The first turbine has an outlet that is in fluid communication with an inlet of the second turbine. One of said first and second turbines is a radial outflow turbine. The arrangement provides for a relatively compact package. The radial outflow turbine may have a particular structure in which there is provided a deflector member at or near its inlet for directing the gas outwards, a stator for introducing swirl and a downstream turbine rotor. A shroud is fixed to blades of the turbine rotor to prevent leakage and to provide additional structural rigidity.

22 Claims, 8 Drawing Sheets

TURBOMACHINE SYSTEM AND TURBINE THEREFOR

CROSS REFERECE TO RELATED APPLICATIONS

The present application claims priority to United Kingdom Patent Application No. GB0800451.7, filed Jan. 11, 2008, which is incorporated herein by reference.

The present invention relates to a turbomachine system and particularly, but not exclusively, to a multi-stage turbocharger system.

Turbomachines such as turbines and compressors generally comprise a bladed rotor that rotates in such a way to add or remove energy to or from a stream of fluid passing over it.

Turbochargers are well known turbomachine devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In a typical turbocharger, the turbine stage comprises a turbine chamber within which the turbine wheel is mounted. Exhaust gas enters through an inlet volute that is radially outboard of the wheel and flows in a generally radial inwards direction to an annular inlet passageway defined between facing radial walls arranged around the turbine chamber before it passes through the turbine wheel from where it egresses via an outlet passageway extending axially (parallel to the shaft axis) from the turbine chamber. The passageways and chambers communicate such that pressurised exhaust gas admitted to the inlet chamber flows in a generally radial direction through the inlet passageway to the outlet passageway via the turbine and rotates the turbine wheel. In the outlet passageway the gas flows in a generally axial direction. Turbine performance can be varied by providing vanes in the inlet passageway so as to deflect gas flowing through the inlet passageway towards the direction of rotation of the turbine wheel.

Turbocharging efficiency for an engine with a wide speed/load range can be improved by providing a sequential two-stage turbocharging system, comprising one relatively small high pressure turbocharger and another relatively large low pressure turbocharger. The turbochargers are arranged in series so that exhaust from the engine flows first through the smaller turbine of the high-pressure turbocharger and then through the larger turbine of the low-pressure turbocharger. A valve controlled bypass passage is provided for allowing exhaust gas to bypass the high-pressure turbine at high engine speeds and/or loads so as to prevent the turbocharger reaching excessive speeds. The valve may also be operated to modulate the exhaust gas flow to the HP and LP turbochargers in varied operating conditions, and in accordance with various possible control regimes. Similarly, the compressors of the two turbochargers are also arranged in series, with air flowing first through the relatively large compressor of the low-pressure turbocharger and then through the relatively small compressor of the high-pressure turbocharger. Again, a valve-controlled bypass is provided to allow the inlet air to bypass the compressor of the high-pressure turbocharger at high engine speeds and/or loads.

It is one object, amongst others, of the embodiments of the present invention to provide for an alternative and/or improved multi-stage turbomachine system such as, for example, a multi-stage turbocharger system.

According to a first aspect of the present invention there is provided a turbomachine system comprising: a first turbocharger comprising an exhaust gas flow first turbine for location in an exhaust path and a first compressor driven by said first turbine; and a turbomachine for location in the exhaust path upstream or downstream of said first turbocharger and comprising an exhaust gas flow second turbine, wherein one of said first and second exhaust gas flow turbines is a radial outflow turbine.

The turbomachine may comprise only a second turbine which may or may not comprise a shaft which is common to the first turbocharger. Alternatively, the second turbine may be drivingly connected to a motor and/or generator, a crankshaft, a pump, or a compressor. It may be connected to a compressor pump for driving exhaust gas recirculation. The second turbine may be a power turbine which may be an axial flow power turbine in which exhaust gas passes in a generally axial direction through the turbine wheel. Again the second turbine may or may not comprise a shaft that is common to the turbocharger.

The first turbine may be upstream of the second turbine and may have an outlet that is in fluid communication with an inlet of the second turbine.

The turbomachine may be a second turbocharger for location in the exhaust path downstream of the first turbocharger with the second exhaust gas flow turbine being drivingly connected to a second compressor.

A radial outflow turbine is intended to mean one in which the exhaust gas is directed outwardly relative from the inlet through the turbine with respect to a rotational axis of the turbine. Whilst the flow proceeds in a generally radial outwards direction this does not exclude the possibility of the flow through the turbine also having an axial and/or circumferential directional component. Such a turbine is in contrast to a conventionally used radial inflow turbine in which exhaust gas flows around an inlet volute and is then directed substantially radially inwards through the turbine wheel, exiting the turbine wheel in a generally axial direction.

The radial outflow turbine comprises a turbine wheel and the exhaust gas is directed radially outwards through the wheel. The wheel may comprise a plurality of blades supported on a hub, the gas travelling in a channel defined between the blades.

Further turbochargers may be provided in the exhaust path downstream of the second turbocharger.

The first turbocharger may be a high-pressure turbocharger which may be relatively small and the second turbocharger may be a low-pressure turbocharger which may be relatively large.

The provision of a radial outflow turbine allows the turbomachine or turbocharger system to be arranged in a compact manner without the need for excess or cumbersome ducting between the first and second turbines.

The first turbine may be the radial outflow turbine and may have a housing defining the outlet. The second turbine may be a radial inflow turbine and may have a housing defining an inlet, the outlet of the first turbine being connected to the inlet of the second turbine. The first turbine may have an inlet that extends in a substantially axial direction, as may the outlet of the second turbine. The outlet of the first turbine may be connected directly or indirectly to the inlet of the second turbine. The first turbocharger may have a first rotational axis and the turbomachine or second turbocharger may have a second rotation axis, the axes being arranged such that they are substantially coaxial, that is the first turbocharger and the turbomachine are positioned one after the other such that their respective the axes are aligned or substantially coincident. The first and second turbines may share a common shaft or may have first and second shafts, one mounted substantially concentrically within the other. As an alternative, the first turbocharger and the turbomachine may be arranged such that the first and second rotational axes are offset and substantially in parallel such that the turbocharger and turbomachine are in an approximately side-by-side relationship.

The first turbine may be a radial inflow turbine and may have a housing defining the outlet and the second turbine may be a radial outflow turbine and may have a housing defining the inlet, the outlet of the first turbine being connected to the inlet of the second turbine, directly or indirectly. In this instance, the first turbocharger may have a first rotational axis and the turbomachine or second turbocharger may have a second rotation axis, the first turbocharger and the turbomachine being arranged such that the first and second rotational axes are substantially coaxial. The first turbine may have a substantially axially extending inlet and the second turbine may have a substantially axially extending outlet.

The housing of the radial outflow turbine may house a turbine wheel having a plurality of turbine blades, the wheel being rotatable about a turbine axis, and the housing may also define an inlet that extends in a substantially axial direction and a passage extending outwardly between the inlet and the blades of the turbine wheel.

A stator may be provided in the passage of the radial outflow turbine. The stator may have a plurality of vanes for guiding the flow of exhaust gas towards the turbine blades. The vanes may take any suitable form but in one embodiment of the invention they may be in the general shape of an aerofoil with an upstream leading edge and a downstream trailing edge. Each vane may also have a pair of side edges extending between the leading and trailing edges. The vanes may be configured to impart swirl in the flow of exhaust gas before it impinges on the turbine wheel. A deflector member may be located at and/or adjacent to the inlet for deflecting the exhaust flow outwardly from the inlet to the stator vanes. It may take the form of a flared body with an outwardly directed surface which may be curved.

The stator vanes may be fixed to the deflector member at any suitable location including, for example, to a peripheral annulus of the deflector member that extends in a generally radially direction or to the outwardly flared body. The side edges of the vanes may be supported between the deflector member and a shroud member. A shroud member may fixed to one side of the turbine blades. Each of the shroud members may be an annular plate.

The housing of the radial outflow turbine may take any suitable form that supports the flow of exhaust gas radially outwards from an inlet to an outlet. In one embodiment the outlet may be substantially symmetrical about a plane that passes through the axis of the turbine.

The outlet of the radial outflow turbine housing may comprise an outlet passage defined around the periphery of the blades and connected to a downstream outlet conduit directed away from the blades.

An exhaust gas flow control valve may be provided for controlling the flow of exhaust gas in the exhaust path and a bypass exhaust gas path which bypasses the first turbine or both the first and second turbine. The flow control valve may comprise: an inlet port in communication with a first portion of the exhaust gas bypass path that is in communication with the exhaust path upstream of the first turbine; a first outlet port in communication with a second portion of the exhaust bypass flow path which is in communication with exhaust path downstream of said first turbine but upstream of said second turbine. There may be provided a second outlet port in communication with a third portion of the bypass exhaust gas passage which is in communication with the exhaust path downstream of said second turbine; wherein the valve is operable to selectively permit or block flow through the first and second outlet ports.

The exhaust gas control valve may thus be operable selectively to permit exhaust gas flow to bypass the first turbine only, or to bypass both the first and second turbines. As such, the valve is operable both as a first turbine bypass valve, and also as a "wastegate" valve for the second turbine.

One or both of the turbines may comprise a variable geometry mechanism of any suitable form. In the instance where the turbine is a radial outflow turbine with a stator, the vanes may form part of the variable geometry mechanism.

According to a second aspect of the present invention there is provided a radial outflow turbine comprising a housing defining an inlet and an outlet, a rotor in said housing between the inlet and outlet and rotatable about an axis, the rotor having a body from which a plurality of rotor blades extend, a stator upstream of the rotor for imparting swirl to a gas flow before it is incident on the rotor, a deflector member upstream of the rotor blades for deflecting gas flow outwards from the inlet towards the rotor blades, wherein the rotor blades extend in an axial direction between rotor body and a wall fixed to the blades.

The blades of the rotor are thus supported between the wall and the rotor body so as to provide structural rigidity against forces generated in use such as, for example, centripetal forces.

The wall may be in the form of an annular shroud, which may be plate-like. The shroud may have a substantially radially extending surface at which it is fixed to the blades. The rotor body may have any suitable form and may comprise an outer portion that is substantially opposite to the wall fixed to the blades. The outer portion may be substantially coterminous with the wall. The rotor may further comprise a shaft to which the body is fixed.

The stator may comprise a plurality of vanes defining fluid flow passages between them.

The stator may be downstream of the deflector member or may be supported on or over at least part of the deflector member. The vanes may be supported on a radially outer portion of the deflector member. The outer portion may define a surface that extends in a substantially radial direction, the vanes being supported on the surface.

The deflector member may be configured for deflecting gas from the inlet in an outwards direction with both radial and axial components. The deflector member may be fixed relative to the rotor or may be fixed thereto so that it is rotatable therewith. In the former case it may be fixed to the housing. In the latter case the deflector member may form part of the rotor body and may be integrally formed therewith. The deflector member may define a deflecting surface for directing the gas, the surface being curved and extending in an axial and radial direction. The deflector member surface may have a peripheral portion that extends in a substantially radial direction.

The stator vanes may each have a leading edge and a trailing edge and opposite first and second side edges extending between the leading and trailing edges. The first side edge may be connected to the deflector member and the second side edge may be fixed to a shroud, which may be annular and may be plate-like. The leading and trailing edges may be parallel and extend in a substantially axial direction or otherwise. Alternatively, the trailing edge may be inclined relative to the leading edge. The trailing edge may have at least one discontinuity which may be a notch.

The inlet may extend in a generally axial direction.

The outlet of the radial outflow turbine housing may comprise an outlet passage defined around the periphery of the blades and connected to a downstream outlet conduit directed away from the blades. The outlet passage thus receives gas egressing from the outer periphery of the rotor and directs it to the outlet conduit. The housing may be symmetrical about a plane that intersects the rotor axis and extends in a substantially radial direction. The plane may also extend along a central axis of the outlet conduit.

The stator vanes may form part of a variable geometry mechanism that, in use, controls the flow of gas through the turbine rotor. The stator vanes may be moveable so as to restrict the passage of the gas to the rotor blades. They may be moveable in a generally axial direction to adjust the width of an annular passage or they may be pivotally mounted.

According to a third aspect of the present invention there is provided a radial outflow turbine comprising a housing defining an inlet and an outlet, a rotor in said housing between the inlet and outlet and rotatable about an axis, the rotor having a body from which a plurality of rotor blades extend, a stator upstream of the rotor for imparting swirl to a gas flow before it is incident on the rotor, a deflector member upstream of the rotor blades for deflecting gas flow outwards from the inlet towards the rotor blades, wherein the outlet comprises an outlet passage defined around the periphery of the blades and connected to a downstream outlet conduit directed away from the blades, the outlet passage being substantially symmetrical about a plane that intersects the rotor axis and extends in a substantially radial direction.

According to a fourth aspect of the present invention there is provided a turbocharger comprising a turbine as defined above and a compressor drivable by the turbine.

Specific embodiments of the present invention will now be described, by way of example only, with reference to the accompanying drawings, in which.

Figure 2:
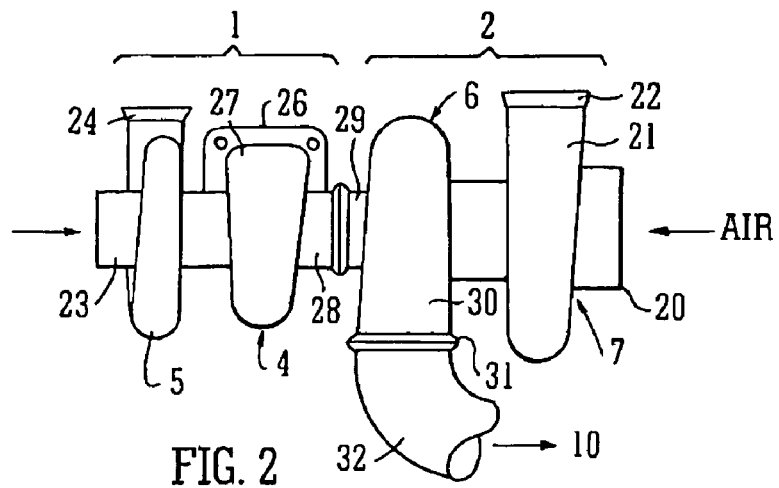
FIG. 2 is a side view of a first embodiment of a two-stage turbocharger in accordance with the present invention and including a radial outflow turbine in a low-pressure stage.
Figures 3A, 3B:
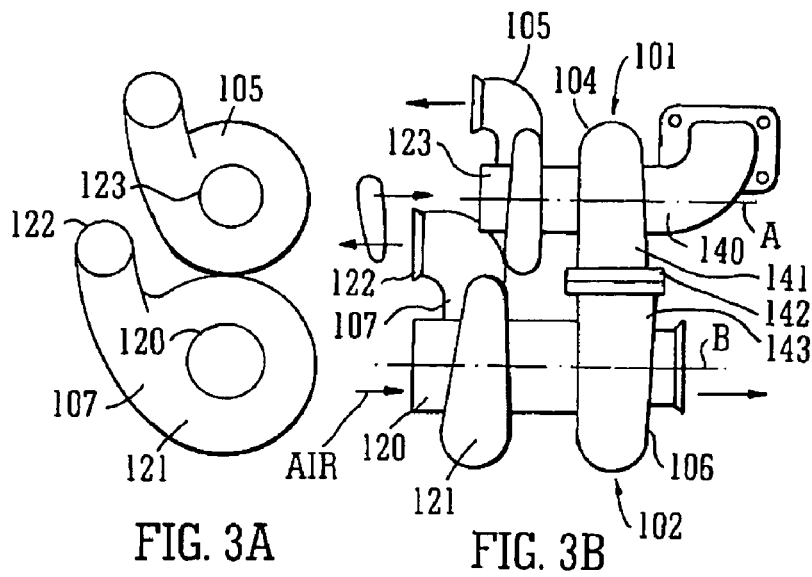
FIG. 3a is a side view of a second embodiment of a two-stage turbocharger in accordance with the present invention and including a radial outflow turbine in a high-pressure stage.
FIG. 3b is an end view of the turbocharger system of FIG. 3.
Figures 4A, 4B:
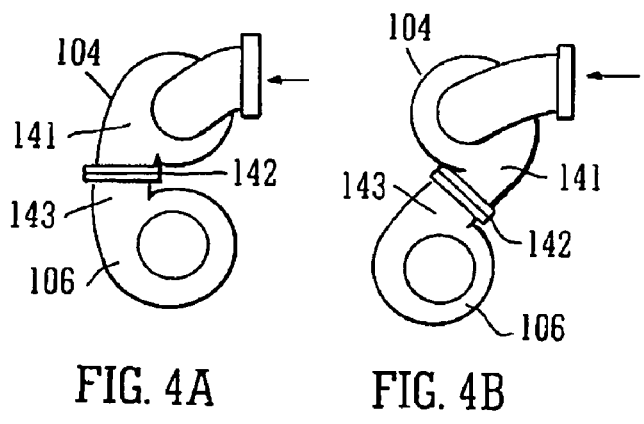
Figure 5:
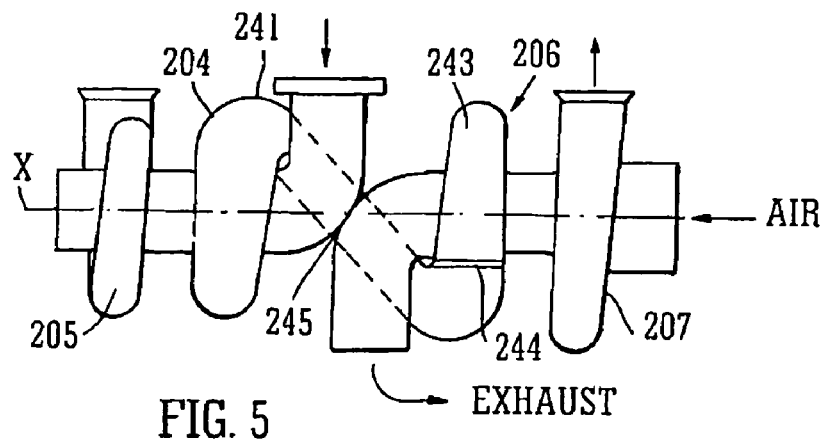
Figure 6:
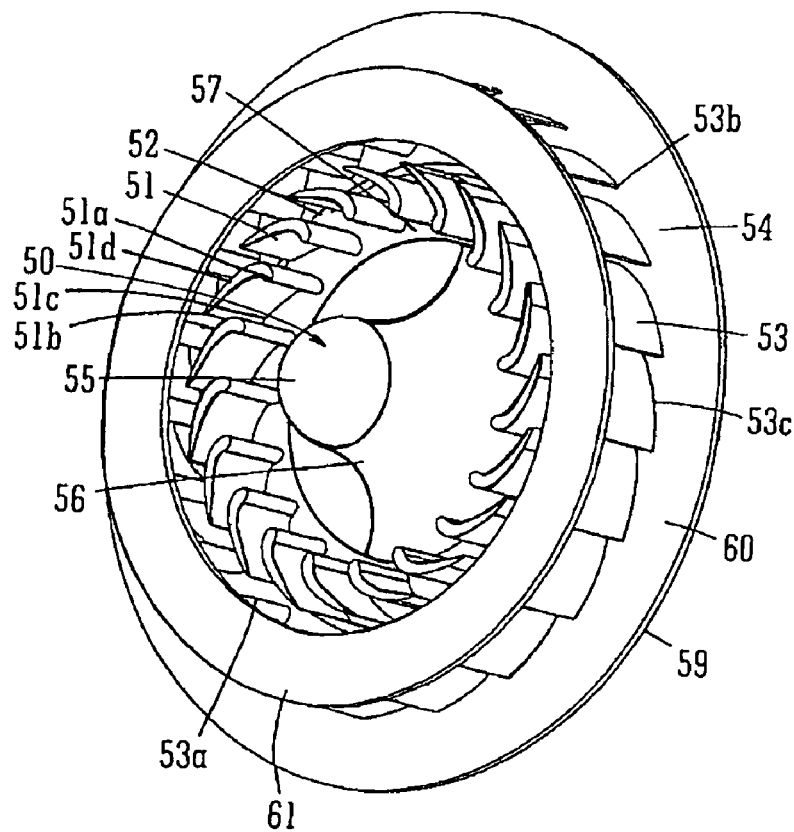
Figure 7:
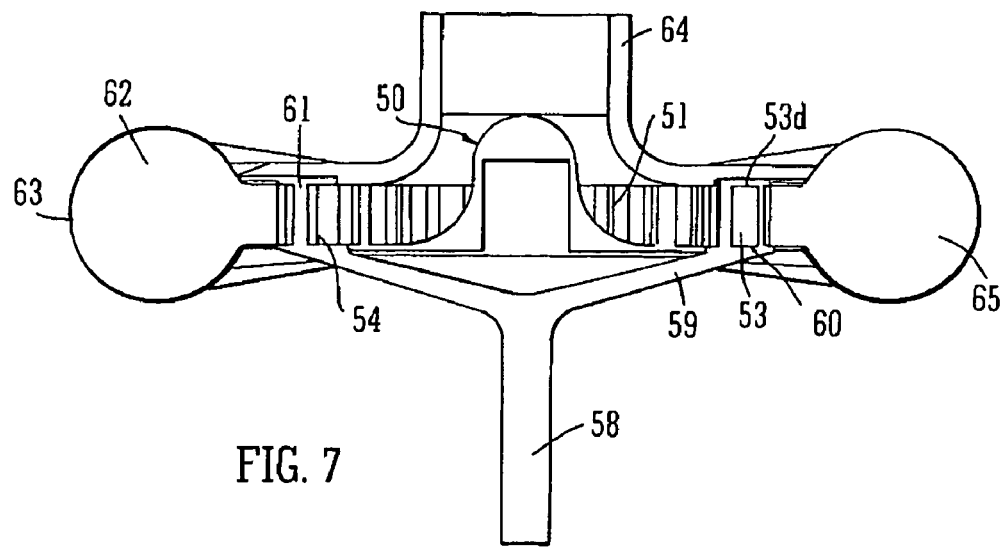
Figure 8:
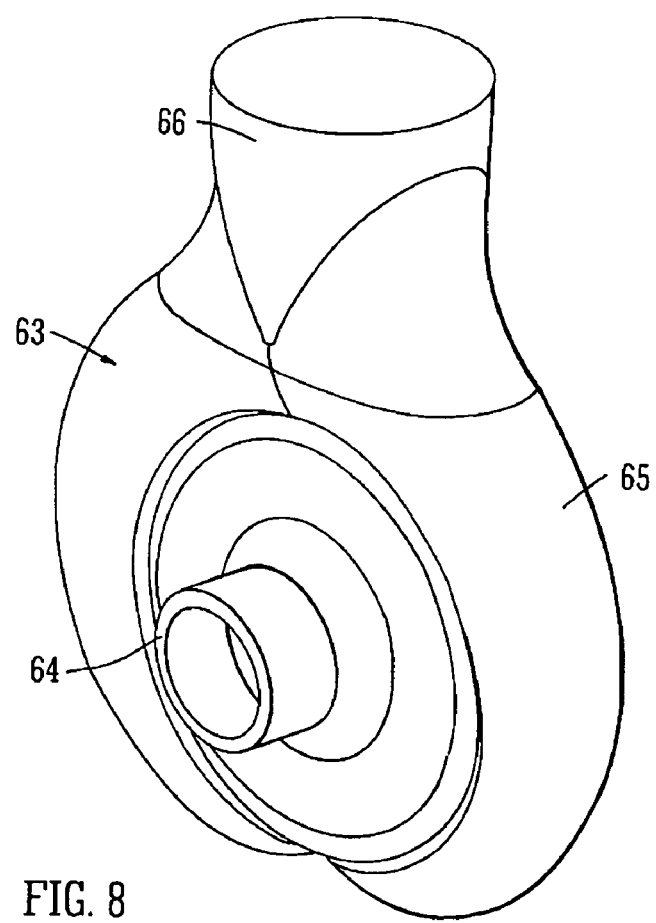
Figure 9:
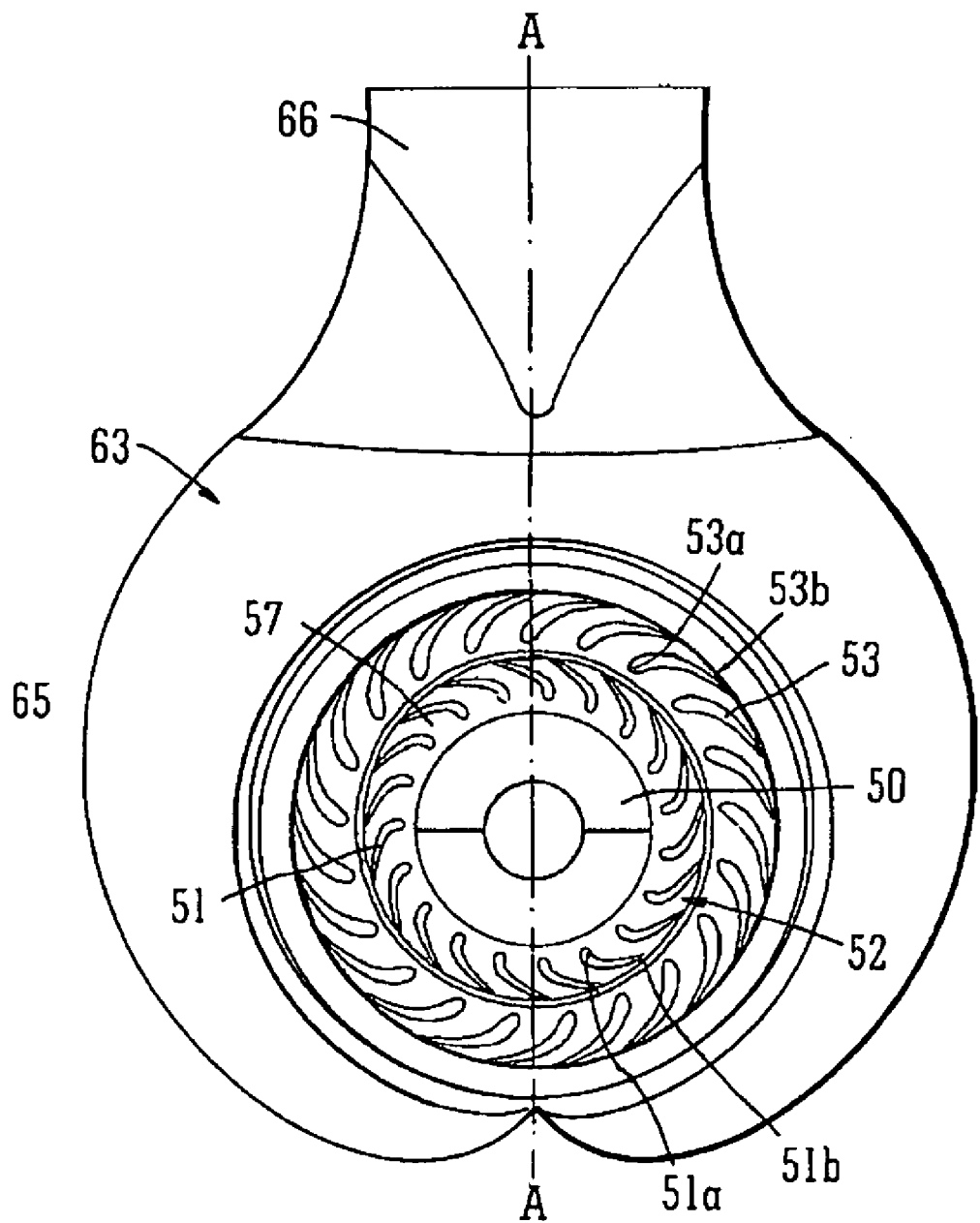
Figure 10:
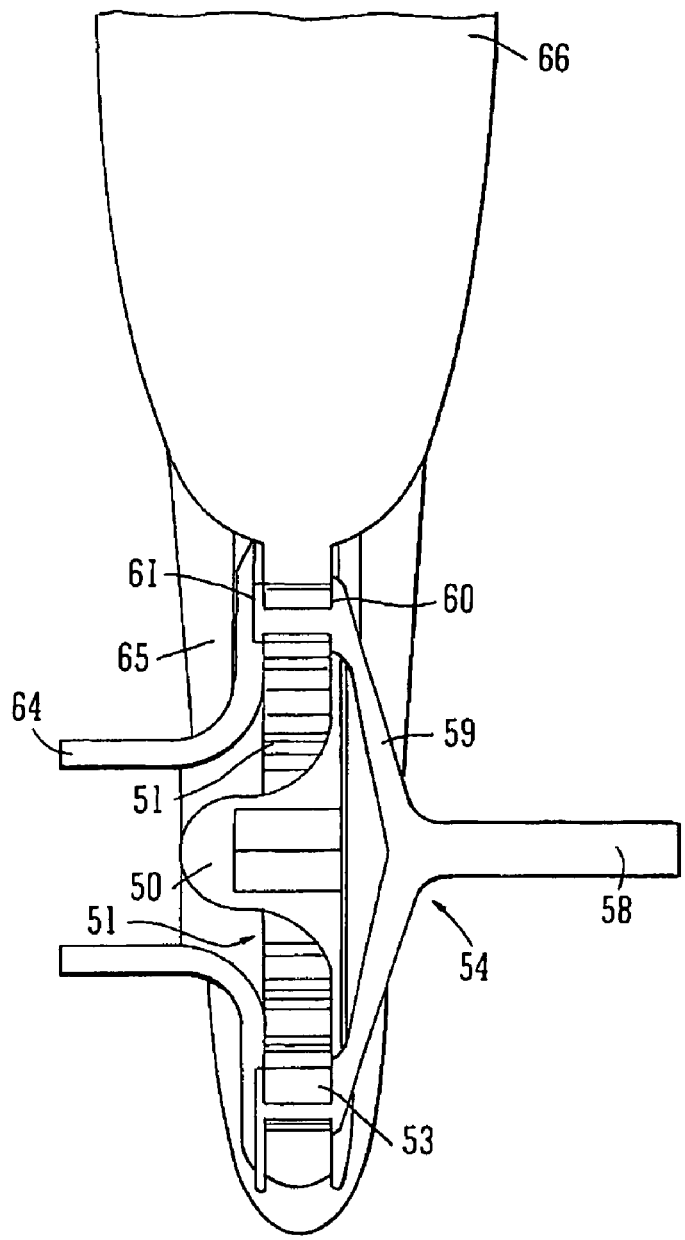
Figure 11:
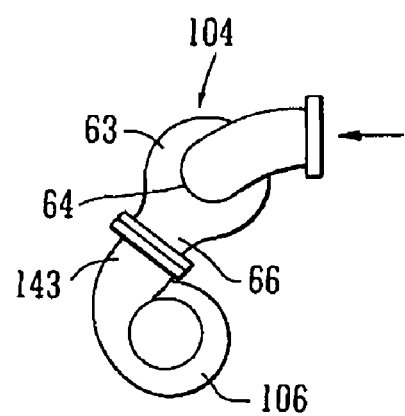
Figure 12A:
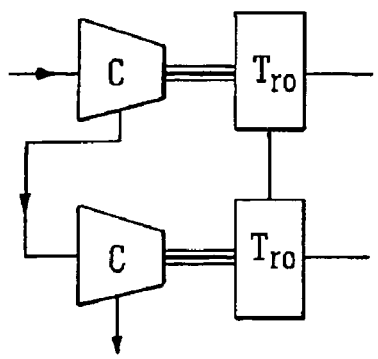
Figure 12B:
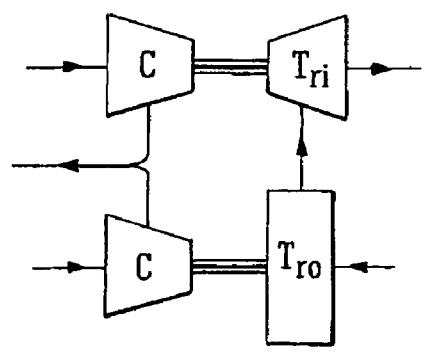
Figure 12C:
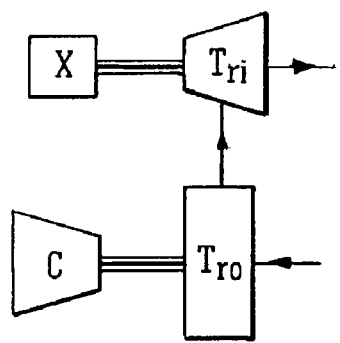
Figure 12D:
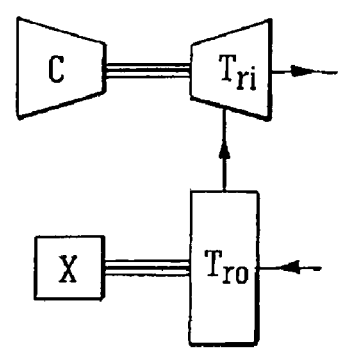
Figure 12E:
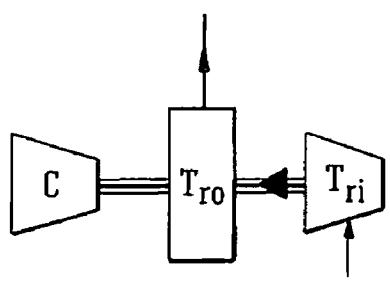
Figure 12F:
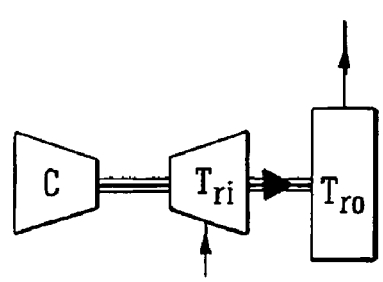

FIGS. 4a and b show end views of two alternative arrangements of the low-pressure and high-pressure turbines in the turbocharger of FIG. 3;

FIG. 5 is a side view of a third embodiment of a two-stage turbocharger including a radial outflow turbine in a high-pressure stage;

FIG. 6 is a perspective view of the inside of a symmetrical radial outflow turbine that may be used in the arrangement of FIGS. 2, 3 and 5, illustrating a stator, a turbine wheel and a shroud;

FIG. 7 is a cross-section through the radial outflow turbine of FIG. 6, shown with housing;

FIG. 8 is a perspective view from one end of the radial outflow turbine of FIG. 7 shown complete with its housing;

FIG. 9 is an end view of the radial outflow turbine housing of FIG. 8 which is partially cut-away to illustrate the turbine wheel and the stator;

FIG. 10 is a cross-sectional view along line A-A of FIG. 9 but without the cut-away;

FIG. 11 shows an end view of the turbine of FIGS. 6 to 10 connected to a conventional radial inflow turbine as an alternative to the arrangement shown in FIGS. 4a and 4b;

FIGS. 12a-12f are schematic illustrations of examples of different turbomachine system arrangements; and FIGS. 13a-13f are axial sectioned views of parts of alternative embodiments of a turbomachine system in accordance with the present invention.

Figure 1:
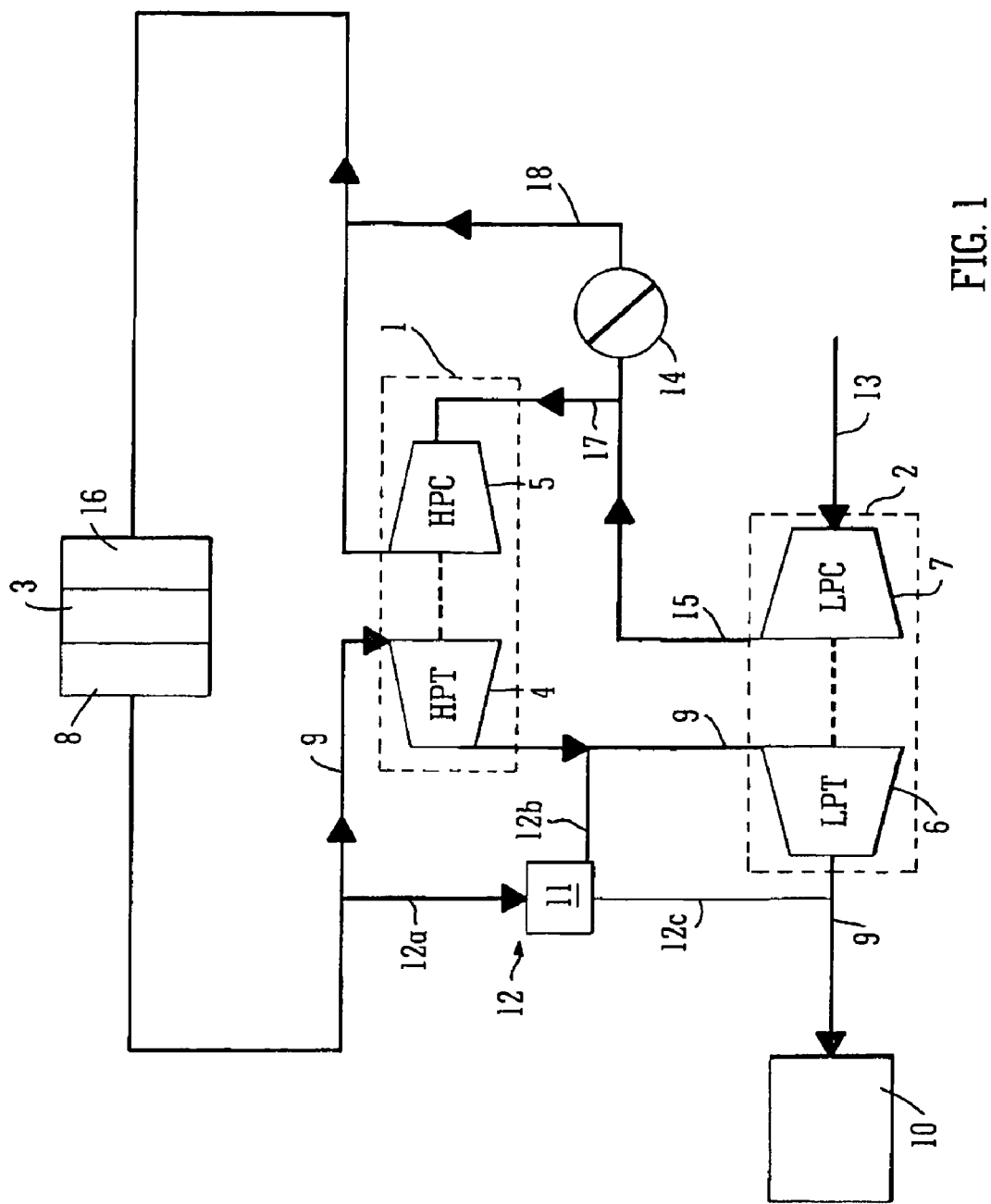
FIG. 1 is a schematic illustration of a two-stage turbocharging system according to an embodiment of the present invention.

Referring first to FIG. 1, the schematically illustrated sequential two-stage turbocharging system comprises a relatively small high-pressure (HP) turbocharger 1 and a relatively large low-pressure (LP) turbocharger 2 connected in series to an internal combustion engine 3 such as a diesel engine. The HP turbocharger 1 comprises a relatively small exhaust turbine 4 and a relatively small compressor 5. The LP turbocharger 2 comprises a relatively large exhaust turbine 6 and a relatively large compressor 7.

Exhaust gas flows through the turbocharger system from an exhaust manifold 8 of the engine 3, via a first exhaust gas flow path 9. The flow path 9 directs exhaust gas flow first through the upstream HP turbine 4 and then through the downstream LP turbine 6. Exhaust gas flow leaving the LP turbine 6 along flow path 9 may be fed to a conventional exhaust system 10 which may for instance include an exhaust after-treatment system. The after-treatment system may be one of a variety of types of after-treatment system, including conventional systems generally known to one or ordinary skill in the art. Types of after-treatment systems contemplated include those designed to remove particulates, nitrogen-oxide compounds, and other regulated emissions.

An exhaust gas flow control valve 11 is provided in a bypass gas path 12 to allow at least a portion of the exhaust gas flow 12a to bypass the HP turbine 4 and flow straight to the LP turbine 6 (path 12b) under certain operating conditions. Alternatively, it may be used to allow some of the bypass flow to bypass both the high-pressure and low-pressure turbines along path 12c The turbocharging system delivers compressed air to the engine (including any after cooler as appropriate) via an air inlet 13 to the LP compressor 7. An air flow control valve 14 is provided to control the flow from the LP compressor outlet path 15 to the engine intake manifold 16 (via any after-cooler etc). The air flow control valve 14, which may for instance be a conventional butterfly valve (or other valve type such as a rotary valve, gate valve, flap valve, poppet etc), is operable to control air flow along two possible downstream flow paths, a first flow path 17 via the HP compressor 5, and a second, bypass, flow path 18 which allows the air flow to bypass the HP compressor 5. The air flow control valve 14 may be controlled by, for instance, the engine management system electronic control unit-ECU.

It will be appreciated that as the HP bypass path 12a-12b is opened by operation of the valve 11, the HP compressor bypass valve 14 may also be opened as an increasing amount of boost is provided by the LP compressor 7. The overall boost pressure produced by the turbocharging system may rise, or may remain constant, as the HP bypass path 12a-12b is opened depending upon the particular control regime for the control valve 11 and bypass valve 14.

At high engine load and/or speed, at which the valve 11 is moved to the position in which the HP bypass path 12a-12b is fully open, the turbocharging system again functions effectively as a single turbocharger system, with virtually all of the work now being done by the larger LP turbocharger 2. At this point the HP compressor bypass valve 14 will typically be fully open to bypass the HP compressor 5. There will, however, still be some exhaust gas flow through the HP turbine 4 as there will be a pressure difference across it. Although this would produce negligible work, it will nevertheless ensure that the HP turbine 4 continues to rotate to help provide a smooth transfer of work with little turbo-lag in the HP turbocharger 1 as engine conditions change and the valve 11 is operated to reduce the bypass flow, transferring compression work to the HP turbocharger 1.

The multi-stage turbocharger system embodiment of FIG. 2 shows a high-pressure turbocharger 1 connected in series to a low-pressure turbocharger 2 in a co-axial in-line arrangement. That is, the central axis of the high-pressure turbocharger 1 (about which the turbocharger shaft rotates) is substantially aligned with the central axis of the low-pressure turbocharger 2. Only the housings of the compressor and turbines are shown for simplicity and it will be seen that they are arranged in a line. Air enters the system at the axially extending inlet 20 of the low-pressure compressor 7, as indicated on the right in the figure. This compressor 7 is of conventional configuration and provides low-pressure air boost to an outlet volute 21 from which it egresses at an outlet port 22. This is connected via a suitable duct or conduit (not shown) to the inlet 23 of the high-pressure compressor 5 shown in the left in FIG. 2. The low-pressure air boost enters the axially extending inlet 23 of the high-pressure compressor 5 and leaves via an outlet port 24 of an outlet volute from where it is delivered to the intake manifold 16 of the engine 3. Exhaust gas from the exhaust manifold 8 of the engine 3 is delivered to the inlet port 26 of an inlet volute 27 of the high-pressure turbine 4 which is a conventional radial inflow turbine. The exhaust gas flows inwardly from the volute 27 to the turbine wheel through a generally radially extending inlet passage before exiting through an axially extending outlet 28. This high-pressure turbine 4 drives the immediately adjacent high-pressure compressor 5 to which it is connected. From the outlet 28 the exhaust gas is delivered to a low-pressure radial outflow turbine 6, which is next in the line. The low-pressure radial outflow turbine 6 has an axially extending inlet 29 connected coaxially with the outlet 28 of the high-pressure turbine 4. The gas flows outwards through a turbine wheel in a generally radial direction to an outlet volute 30 that surrounds the periphery of the wheel and from there it leaves the turbine housing through an outlet port 31 and passes into an outlet duct or conduit 32 to an exhaust system 10.

The configuration of FIG. 2 provides for a two-stage turbocharger system in a housing package that is long but otherwise compact in that it occupies no more vertical or lateral space (i.e. in a direction perpendicular to the axes) than the larger of the two turbochargers 1, 2. This is made possible by using a radial outflow turbine as the low-pressure turbine 6.

An alternative arrangement is shown in FIG. 3 in which components corresponding to those of FIGS. 1 and 2 are given the same reference numerals but increased by 100. In this embodiment a radial outflow turbine is used in the high-pressure stage rather than in the low-pressure stage. The high-pressure and low-pressure turbochargers 101, 102 are arranged in series but with their respective axes A, B spaced apart and arranged substantially in parallel. The engine exhaust gas is delivered to an axial inlet 140 of the radial outflow high-pressure turbine 104 from where it passes outwardly into the outlet volute 141, through the outlet port 142 and into the inlet volute 143 of a conventional radial inflow turbine 106 of the low-pressure stage. The air enters the system at the inlet 120 of the low-pressure compressor 107 and the low-pressure boost air egresses from an outlet port 122 of the compressor outlet volute 121. From there the low-pressure boost air is directed via suitable a duct or conduit (not shown) to the axially extending inlet 123 of the high-pressure compressor 105. An end view of the two compressors 105, 107 is shown in FIG. 3a The two turbine housings may be connected in one of two different ways as shown in FIGS. 4a and 4b. In FIG. 4a the flow in the outlet volute 141 of the high-pressure radial outflow turbine 104 is anti-clockwise and this enters the inlet volute 143 of the low-pressure turbine 106 which also directs the gas flow in an anti-clockwise direction. The alternative arrangement of FIG. 4b shows the outlet volute 141 of the high-pressure turbine 104 being configured to induce a clockwise rotation of exhaust gas. The inlet volute 143 of the low-pressure turbine 106 is again arranged so that gas flows in an anti-clockwise direction but the housing is itself rotated to accommodate the change in position of the outlet port 142 of the high-pressure turbine housing.

The arrangements of FIGS. 3 and 4 provide a multi-stage turbocharger system with a relatively short package, which is no longer than the longer of the two turbochargers 101, 102. This ensures that the system can be positioned close to the side of the engine 3.

An alternative turbocharger system arrangement with a radial outflow high-pressure turbine 204 is illustrated in FIG. 5. This has the components arranged co-axially and in-line as in the arrangement shown in FIG. 2. In order to achieve this the outlet volute 241 of the radial outflow high-pressure turbine 204 is connected to the inlet port 244 of the inlet volute 243 of the low-pressure radial inflow turbine 206 by means of a duct 245 (partially hidden in FIG. 5, as represented by the dotted line) that extends in a partial helix around the axis X of the system.

All of the arrangements described above lend themselves to having a bypass duct extending from the inlet of the high-pressure turbine 4, 104, 204 to the inlet of the low-pressure turbine 6, 106, 206. As described above this may be necessary under certain operating conditions of the engine to prevent the turbocharger from operating at excessive speeds or an unnecessarily high boost pressure being generated. It may also be used to modulate the exhaust gas flow to the HP and LP turbochargers in varied operating conditions, and in accordance with various possible control regimes.

The boost air from the low-pressure compressor 7, 107, 207 may optionally pass through an intercooler stage (not shown) before entering the inlet of the high-pressure compressor 5, 105, 205.

The compressor housings may be rotated so that their outlets are in the most favourable orientation to suit the installation. The outlets may have bends (90° or otherwise) such as those shown in FIG. 3 in order to suit the most efficient or efficacious arrangement.

The arrangement of the housing of the radial outflow turbine 6, 104, 204 of FIGS. 2, 3 and 5 has been depicted as one that is essentially the same as a radial inflow turbine with the flow of gas going in the opposite direction. It will be appreciated that the turbine wheel and, in particular, the shape of the blades would have to be adapted to accommodate the reverse of flow in a manner that will be understood by the skilled person.

As an alternative, the radial outflow turbine may have a generally symmetrical housing design as depicted in FIGS. 7 to 11. The configuration of the turbine wheel for such a housing is shown in FIG. 6. The axially directed inlet gas flow is deflected outwardly by a central deflector body 50 towards an annular array of stator vanes 51 in an inlet passageway 52 before it encounters the blades 53 of the turbine wheel 54 which are disposed radially outboard of the stator vanes 51. The deflector body 50 has cylindrical rotational symmetry about the central axis of the turbine and can be regarded as having three portions: a substantially hemispherical inner end 55 on the axis is integrally or otherwise joined to an outwardly flared intermediate portion 56 with a concavely curved profile that merges with an outer peripheral portion 57 in the form of a substantially radially extending annulus. The inner end 55 and the intermediate portion 56 extend both axially and radially towards the outer peripheral portion 57. The stator vanes 51 are fixed to the annulus of the outer peripheral portion 57 in a circumferential array and are configured to impart a tangential component of motion to the gas passing between them so as to induce swirl in a first direction of rotation about the axis before the gas impinges on the blades 53 of the rotary turbine wheel 54 where it is directed in the opposite direction by the blades 53 such that the wheel rotates. The stator vanes 51 are each substantially identical to each other with a general curved aerofoil shape extending between leading and trailing edges 51a, 51b in the direction of gas flow and being bound by side edges 51c, 51d in the axial direction.

The turbine wheel 54 comprises a rotary shaft 58 that extends along the axis from the rear of a back plate 59 having a generally radially extending peripheral face 60 on which the blades 53 are supported. The blades 53 have a general aerofoil shape extending in a curve between leading and trailing edges 53a, 53b in the direction of gas flow and being bound by side edges 53c, 53d in the axial direction. A first side edge 53c is fixed to the radially extending face 60 of the back plate 59 whereas the second side edge 53d is fixed to an annular shroud 61 that is designed to prevent leakage flows that would impair turbine efficiency. The gas expands between the blades 53 in the usual manner and then flows outwards (in a direction with circumferential and radial components) into an outlet chamber 62 defined by a housing 63 that is shown in FIGS. 7 to 11. The curvature of the blades is such that by the time the gas passes the trailing edges 53b it flows in an outwards direction with a significant circumferential component so that it swirls in the outlet chamber 62.

The shroud 61 not only serves to prevent leakage flows but also adds structural support to the blades 53. As the turbine wheel rotates the blades are subjected to a large centripetal force and without the support there would be a tendency for them to bend outwards and thereby risk failure.

The housing 63 is symmetrical about a plane that intersects the axis of the turbine, as is the outlet chamber 62. In the representation of FIG. 9 the plane of symmetry extends perpendicular to the page along the dotted line. The housing 63 defines an axial inlet 64 and an outlet chamber volute 65 of generally circular cross-section that increases in size as it extends around the wheel in each direction from a first position (shown at 6 o'clock in FIG. 9) where it is smallest to a diametrically opposite position (12 o'clock in FIG. 9) where it merges with an outlet port 66 defined by the housing 63.

As the blades 53 of the turbine wheel 54 are supported on each side edge 53c, 53d by the peripheral face 60 of the back plate 59 and the shroud 61 respectively, they are able to resist the large bending forces imparted by the exhaust gas flow. A similar annular shroud may be optionally provided for the stator vanes 51.

In an alternative arrangement the central body is not fixed but rotates with the turbine wheel in which case the stator vanes are otherwise supported by, for example, the shroud referred to immediately above.

The provision of a radial outflow turbine allows the outlet of the high-pressure turbine 104 to be connected to the inlet 143 of the low-pressure turbine 106 without the need for extensive or cumbersome intermediate ducting or conduits, as indicated in FIGS. 3 and 11. Moreover, it allows the multi-stage turbocharger to be accommodated in a manageable size of spatial envelope. In conventional two-stage turbochargers using radial inflow turbines the central axes of the two turbochargers are arranged in parallel in order to minimise the size of the spatial envelope occupied by the components. Such an arrangement does not lend itself to connecting the axial outflow of the high-pressure turbine to the inlet of the low-pressure turbine without introducing large conduits or ducting. Radial inflow turbines are used in turbocharger environments as they generally provide the best combination of efficiency and practicability particularly for those of small and medium sizes. The spiral inward flow of the gas through the turbine results in the gas gaining angular velocity which promotes the transfer of energy to the turbine wheel. Radial outflow turbines are generally considered to be inefficient as the gas spiral outwards and therefore loses angular velocity. However, it has been realised that the space savings that result from the adoption of a radial outflow turbine are sufficient to outweigh the disadvantage of the lower efficiency performance of a radial outflow turbine and it is considered that the perceived inefficiency of such turbines in a multistage turbomachine system is not as great as originally anticipated. Moreover, the particular turbine design illustrated in FIGS. 7 to 11 has an improved efficiency as the turbine blades are disposed downstream of (and radially outboard of) a flared hub that serves to direct the gas outwards flow from generally a generally axial direction to generally radial direction (but with swirl). The radial distance of the path of the gas from the axis increases as it passes from the stator to the turbine blades by a relatively small amount such as, for example, 20%. The gas swirl is induced by the stator after the path of the gas has been redirected outwardly and so there is no significant loss of angular velocity before it is incident on the turbine blades.

Various modifications may be made to the shape or arrangement of the stator vanes 51 in order to modify the efficiency of the turbine and/or to mitigate vibration in the turbine blades 53 caused by their passage over the wakes of the stator vanes 51. In the embodiment depicted in the figures the trailing edges 51b of the stator vanes are substantially parallel to the leading edges 53a of the turbine blades 53 but this could be modified by tilting the vanes 51 such that the edges are not parallel. In addition, or separately, the trailing edge 51b of one or more of the vanes 51 may have one or more notches or discontinuities so as to improve the mixing of the gas flow in the region immediately behind the stator vanes and before it impinges on the turbine blades. More generally, the aerofoil sections of the stator vanes and/or the turbine blades may be configured such that the leading or trailing edges extend in a direction that is inclined to the axial direction.

In a further alternative embodiment (not shown) the stator vanes may be located on the concavely curved intermediate portion of the central body. This would provide for a more compact turbine wheel with reduced radial forces and reduced acceleration lag.

The stator vanes may form part of a variable geometry mechanism that controls the flow of the exhaust gas through the turbine wheel. Variable geometry turbines differ from fixed geometry turbines in that the size of the inlet passageway can be varied to optimise gas flow velocities over a range of mass flow rates so that the power output of the turbine can be varied to suite varying engine demands. For instance, when the volume of exhaust gas being delivered to the turbine is relatively low, the velocity of the gas reaching the turbine wheel is maintained at a level which ensures efficient turbine operation by reducing the size of the inlet passageway. Turbochargers provided with a variable geometry turbine are referred to as variable geometry turbochargers.

In one known type of variable geometry turbine, an axially moveable wall member, generally referred to as a "nozzle ring", defines one wall of the inlet passageway. The position of the nozzle ring relative to a facing wall of the inlet passageway is adjustable to control the axial width of the inlet passageway. Thus, for example, as gas flow through the turbine decreases, the inlet passageway width may be decreased to maintain gas velocity and optimise turbine output. In such a configuration the stator vanes may be fixed to the axially movable wall member of the nozzle ring such that they move with it and into slots provided in the facing wall or, alternatively, it may be slotted so that it moves relative to fixed stator vanes. Examples of nozzle ring arrangements are described in our European patent nos. 1435434 and 06544587 the content of which are incorporated by reference.

In an alternative arrangement the stator vanes may form part of another type of variable geometry turbine known as the "swing vane" type. Each stator vane is pivotally mounted in the inlet passageway about a respective pivot axis extending across the inlet substantially parallel to the turbine axis. A vane actuating mechanism is provided which is linked to each of the vanes and is displaceable in a manner which causes each of the vanes to move in unison, such a movement enabling the cross-sectional area of the inlet, and also the angle of approach of the gas turbine wheel, to be controlled.

As an alternative, or in addition to the above variable geometry mechanisms being applied to the radial outflow turbine, the radial inflow turbine may have a variable geometry mechanism.

The described embodiments may be used in a multi-stage turbocharging system in which the functionality of a HP turbine bypass valve and an LP turbine wastegate are combined into a single exhaust gas flow control valve, as described in our co-pending UK patent application No. 0717212.5, the content of which is incorporated herein by reference.

The exhaust gas control valve 11 can be housed externally of the LP turbocharger (in an appropriate housing), or can be conveniently housed in a suitably adapted LP turbine housing.

The turbocharger system of the present invention may be incorporated in an engine with an exhaust gas recirculation (EGR) system. In an EGR system a portion of the exhaust gas taken from the exhaust manifold is reintroduced into the inlet manifold of the engine for further combustion with a view to reducing engine emissions. A portion of the exhaust gas is directed to the intake manifold 16 of the engine 3 via an EGR cooler.

In the above described embodiments of the invention there is a single HP turbine. However, it will be appreciated that a turbocharging system according to the present invention could for instance include two parallel HP turbines, one or both of which may be a radial outflow turbine. For example, each of two HP turbines could receive an exhaust gas flow from a respective bank of cylinders from a multi-cylinder engine (for instance each receiving exhaust gas from one bank of a "V" configured engine). In such an embodiment the outlets for each HP turbine could be combined upstream of a single LP turbine, and a single exhaust control valve 11 according to the present invention provided in which the HP bypass path 12a/12b communicates between the exhaust path 9 upstream of the two HP turbines, and with the exhaust gas path 9 upstream of the LP turbine but after the two HP turbine outlets are combined.

In embodiments comprising more than one HP turbine, HP turbines can be linked to a common HP compressor or to separate respective HP compressors.

It will further be appreciated that the present invention is not limited to a two-stage sequential turbocharging system, but could be embodied in a turbocharging system comprising more than two turbine stages connected in series.

The present invention has application to turbomachine systems in general, that is to say that one of the turbochargers in the above described embodiments may be substituted for a turbomachine such as, for example, a power turbine that is connected by a mechanical or fluid coupling to a crankshaft of an internal combustion engine. The turbine may have the same shaft as the turbocharger. Other examples in the automotive field include an electricity generating turbine that is connected to a generator of a hybrid vehicle, or a compressor pump that drives exhaust gas recirculation whereby exhaust gas is returned to the air inlet system of the internal combustion engine for combustion with the usual intake of air and fuel.

FIGS. 12a to 12f illustrate, in block diagram form, different possible turbomachine system arrangements each employing a turbocharger with a compressor C and a turbomachine (which may or may not be a turbocharger) comprising at least a turbine which may be mounted on the same shaft as the turbocharger. At least one of the turbocharger and the turbomachine has a radial outflow turbine represented by the reference $T_{ro}$. A conventional radial inflow turbine is represented by reference $T_{ri}$. Reference X in the turbomachine represents any one of a motor/generator, an exhaust gas compressor pump for driving exhaust gas recirculation or a mechanical or fluid coupling for connection to a crankshaft and driven by a power turbine. It will be understood that the turbomachine may simply comprise a turbine connected to the turbocharger either by a coupling or by virtue of a shaft that is common to the turbocharger.

Figure 13A:
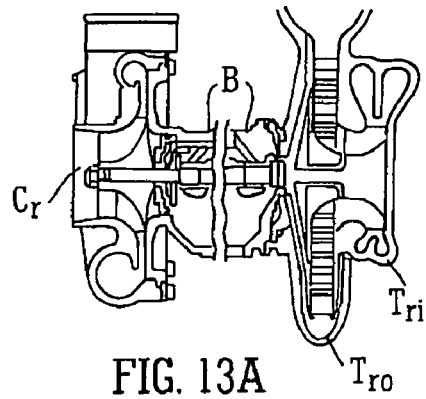
Figure 13B:
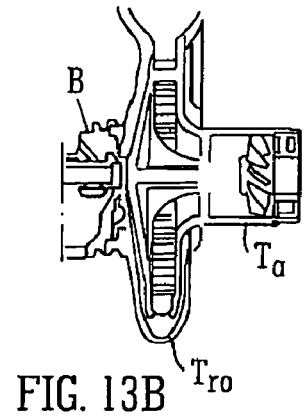
Figure 13C:
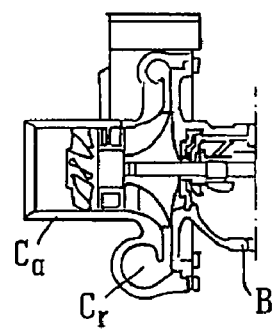
Figure 13D:
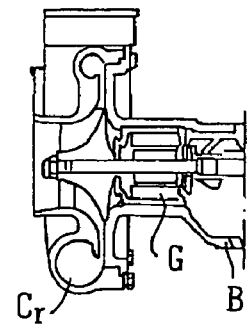
Figure 13F:
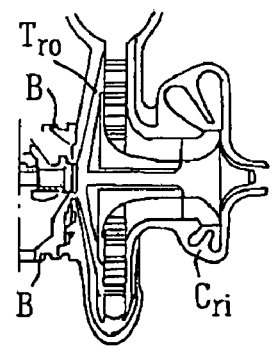
Figure 13E:
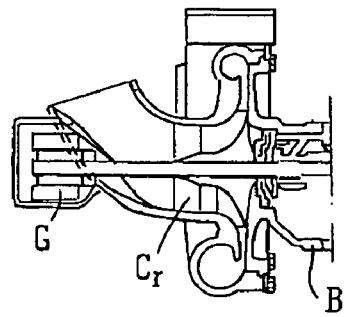

In some embodiments of the present invention, such as that of FIG. 2, the two turbines may have a common shaft, or may have separate shafts that are concentrically disposed whereby a first turbine wheel is mounted on a first shaft at least part of which is received in a hollow second shaft on which the second turbine wheel is mounted. Exemplary arrangements of this kind are shown, by way of illustration only, in FIGS. 13a to 13f. Only parts of the turbomachine system are shown in each case to illustrate its general configuration but it will be appreciated that the use of a common shaft (or concentric shafts) also provides for improvements in that the turbomachine system can be packaged in a compact arrangement. Other variations and modifications to illustrated embodiments will be apparent to the skilled person. In FIG. 13a, there is depicted a turbocharger comprising a radial compressor $C_r$ and a radial outflow turbine $T_{ro}$, the latter being connected to an upstream radial inflow turbine $T_{ri}$ with a common shaft, the turbine $T_{ri}$ being a turbomachine. It will be noted that the turbomachine occupies the same housing as the turbocharger but this is optional. The compressor $C_r$ is connected to the radial outflow turbine $T_{ro}$ via a turbocharger bearing housing B (only part of which is depicted) in the usual way. Exhaust gas leaves the radial inflow turbine outlet in an axial direction from where it enters the axial inlet of the radial outflow turbine $T_{ro}$. In a variation to this arrangement shown in FIG. 13b the radial inflow turbine may be substituted for an axial flow turbine $T_a$ having an axially extending inlet and outlet and a shaft that is common to the turbine $T_{ro}$. FIG. 13c illustrates the possibility of adding an axial compressor Ca to the inlet end of the radial compressor $C_r$ (the rest of the turbomachine system not being shown). FIGS. 13d and 13e illustrate parts of turbomachine embodiments that incorporate a generator/motor G. In FIG. 13d the generator/motor G is fitted between the compressor $C_r$ and the bearing housing B of the turbocharger on the same shaft and in FIG. 13e it is fitted to the exterior of the compressor housing, again on a common shaft. In each case the turbine part or parts of the turbocharger and turbomachine are not shown. FIG. 13f shows a variation to FIG. 13a in which the radial inflow turbine is replaced by a radial inflow compressor $C_{ri}$ for driving exhaust gas recirculation in an internal combustion engine system. The compressor has a shaft that is common to the turbine Tro and an axially extending inlet that is connected to the axially extending outlet of the turbine Tro so as to receive exhaust gas which is then compressed by the compressor impeller and directed to the inlet arrangement of the internal combustion engine.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A turbomachine system comprising:
a first turbocharger comprising an exhaust gas flow first turbine for location in an exhaust path and a first compressor driven by the first turbine;
a turbomachine for location in the exhaust path upstream or downstream of said first turbocharger and comprising an exhaust gas flow second turbine;
wherein the first turbine is a radial outflow turbine and has a housing defining an outlet and the second turbine is a radial inflow turbine and has a housing defining an inlet, the outlet of the first turbine being connected to the inlet of the second turbine.

2. A turbomachine system according to claim 1, wherein the first turbine is upstream of the second turbine and has an outlet that is in fluid communication with an inlet of the second turbine.

3. A turbomachine system according to claim 1, wherein the first turbine has a first rotational axis and the second turbine has a second rotation axis, the first and second turbines being arranged such that the first and second rotational axes are substantially coaxial.

4. A turbomachine according to claim 1, wherein the first turbocharger has a first rotational axis and the second turbocharger has a second rotation axis, the first and second turbocharger being arranged such that the first and second rotational axes are offset and substantially parallel.

5. A turbomachine system according to claim 1, wherein the first turbine is a radial inflow turbine and has a housing defining the outlet and the second turbine is a radial outflow turbine and has a housing defining the inlet, the outlet of the first turbine being connected to the inlet of the second turbine.

6. A turbocharger system according to claim 5, wherein the first turbine has a first rotational axis and the second turbine has a second rotation axis, the first and second turbochargers being arranged such that the first and second rotational axes are substantially coaxial.

7. A turbomachine system according to claim 1, wherein the turbomachine is a second turbocharger for location in the exhaust path downstream of the first turbocharger with the second exhaust gas flow turbine being drivingly connected to a second compressor.

8. A turbomachine system according to claim 1, wherein the housing of the radial outflow turbine houses a turbine wheel having a plurality of turbine blades, the wheel being rotatable about a turbine axis, and wherein the housing defines an inlet that extends in a substantially axial direction and a passage extending outwardly between the inlet and the blades of the turbine wheel.

9. A turbomachine system according to claim 8, wherein there is provided a stator in said passage, said stator having a plurality of vanes for guiding the flow of exhaust gas towards the turbine blades.

10. A turbomachine system according to claim 9, where the vanes are configured to impart swirl in the flow of exhaust gas.

11. A turbomachine system according to claim 9, wherein there is provided a deflector member at and/or adjacent to the inlet for deflecting the exhaust flow outwardly from the inlet towards the turbine blades.

12. A turbomachine system according to claim 11, wherein the stator vanes are fixed to the deflector member.

13. A turbomachine system according to claim 12, wherein the stator vanes are fixed to a peripheral annulus of the deflector member.

14. A turbomachine system according to claim 11, wherein the deflector member has an outwardly flared portion.

15. A turbomachine system according to claim 8, wherein the turbine wheel comprises a body from which the blades extend and there is provided a wall fixed to the turbine blades at an edge that is spaced from the body.

16. A turbomachine system according to claim 15, wherein the wall is an annular shroud plate.

17. A turbomachine system according to claim 8, wherein the outlet of the radial outflow turbine housing comprises an outlet passage defined around the periphery of the blades and connected to a downstream outlet conduit directed away from the blades.

18. A turbomachine systems according to claim 17, wherein the outlet passage is symmetrical about a plane that intersects the turbine axis and extends in a substantially radial direction.

19. A turbomachine system according to claim 1, wherein there is provided an exhaust gas flow control valve including for controlling the flow of exhaust gas in the exhaust path and a bypass exhaust gas path which bypasses the first turbine or both the first and second turbine.

20. A turbomachine system according to claim 19, wherein the flow control valve comprises: an inlet port in communication with a first portion of the exhaust gas bypass path that is in communication with the exhaust path upstream of the first turbine; a first outlet port in communication with a second portion of the exhaust bypass flow path which is in communication with exhaust path downstream of said first turbine but upstream of said second turbine.

21. A turbomachine system according to claim 20, wherein there is provided a second outlet port in communication with a third portion of the bypass exhaust gas passage which is in communication with the exhaust path downstream of said second turbine; wherein the valve is operable to selectively permit or block flow through the first and second outlet ports.

22. A turbomachine system comprising:
- a first turbocharger comprising an exhaust gas flow first turbine for location in an exhaust path and a first compressor driven by the first turbine;
- a turbomachine for location in the exhaust path upstream or downstream of said first turbocharger and comprising an exhaust gas flow second turbine;

wherein:
- the first turbine is a radial outflow turbine and has a housing defining an outlet;
- the second turbine is a radial inflow turbine and has a housing defining an inlet, the outlet of the first turbine being connected to the inlet of the second turbine;
- the housing of the first turbine houses a turbine wheel having a plurality of turbine blades, the wheel being rotatable about a turbine axis;
- an inlet of the first turbine housing extends in a substantially axial direction and a passage extends outwardly between the inlet and the blades of the turbine wheel; and
- the passage includes a stator having a plurality of vanes for guiding the flow of exhaust gas towards the turbine blades.

\* \* \* \* \*